US012650557B2

(12) United States Patent (10) Patent No.: US 12,650,557 B2
Liu et al. (45) Date of Patent: Jun. 9, 2026

(54) OPTICAL MEMBER

(71) Applicants: DENSO CORPORATION, Kariya-city
(JP); **TOYOTA JIDOSHA
KABUSHIKI KAISHA**, Toyota (JP);
MIRISE Technologies Corporation,
Nisshin (JP)

(72) Inventors: Heng Liu, Nisshin (JP); Hiroshi Ando,
Nisshin (JP); Masatoshi Tsuji, Nisshin
(JP); Kojiro Tachi, Nisshin (JP)

(73) Assignees: DENSO CORPORATION, Kariya-city
(JP); **TOYOTA JIDOSHA
KABUSHIKI KAISHA**, Toyota (JP);
MIRISE Technologies Corporation,
Nisshin (JP)

( * ) Notice: Subject to any disclaimer, the term of this
patent is extended or adjusted under 35
U.S.C. 154(b) by 345 days.

(21) Appl. No.: 18/415,102

(22) Filed: Jan. 17, 2024

(65) Prior Publication Data
US 2024/0295699 A1 Sep. 5, 2024

(30) Foreign Application Priority Data
Mar. 2, 2023 (JP) ................................. 2023-032264

(51) Int. Cl.
*G02B 6/26* (2006.01)
*G02B 27/01* (2006.01)

(52) U.S. Cl.
CPC ......... *G02B 6/262* (2013.01); *G02B 27/0101*
(2013.01)

(58) Field of Classification Search
CPC ...................................................... G02B 6/262
See application file for complete search history.

(56) References Cited

U.S. PATENT DOCUMENTS

| | | | | |
|---|---|---|---|---|
| 2004/0085649 | A1* | 5/2004 | Repetto | G02B 27/0101 |
| | | | | 359/633 |
| 2021/0026135 | A1* | 1/2021 | Ishii | G02B 27/0101 |
| 2023/0011557 | A1* | 1/2023 | Park | G02B 27/0172 |

FOREIGN PATENT DOCUMENTS

JP 6372305 B2 8/2015

* cited by examiner

*Primary Examiner* — Edmond C Lau
(74) *Attorney, Agent, or Firm* — Posz Law Group, PLC

(57) ABSTRACT

An optical member includes a light guide body that includes
a smooth incident surface, a reflecting and emitting surface
disposed to face the smooth incident surface, a reflecting
surface continuously arranged with the smooth incident
surface, and a smooth emitting surface continuously
arranged with the reflecting and emitting surface. The
reflecting and emitting surface includes first flat portions
configured to emit a part of an incident light, and first
reflecting portions configured to reflect another part of the
incident light. The reflecting surface includes second flat
portions and second reflecting portions configured to reflect
the light reflected by the first reflecting portions in different
directions toward the smooth emitting surface. The smooth
emitting surface is configured to reflect the light reflected by
the second flat portions by total reflection and emit the light
reflected by the second reflecting portions to the outside.

8 Claims, 15 Drawing Sheets

OPTICAL MEMBER

CROSS REFERENCE TO RELATED APPLICATION

The present application claims the benefit of priority from Japanese Patent Application No. 2023-032264 filed on Mar. 2, 2023. The entire disclosure of the above application is incorporated herein by reference.

TECHNICAL FIELD

The present disclosure relates to an optical member.

BACKGROUND

Conventionally, there has been known an optical member that reflects a part of light entering from an incident surface inside the optical member and emits the incident light and a reflected light to the outside from a surface different from the incident surface.

SUMMARY

The present disclosure provides an optical member including a light guide body. The light guide body includes a smooth incident surface, a reflecting and emitting surface disposed to face the smooth incident surface, a reflecting surface continuously arranged with the smooth incident surface, and a smooth emitting surface continuously arranged with the reflecting and emitting surface. The reflecting and emitting surface includes a plurality of first flat portions configured to emit a part of an incident light, and a plurality of first reflecting portions configured to reflect another part of the incident light. The reflecting surface includes a plurality of second flat portions and a plurality of second reflecting portions configured to reflect the light reflected by the first reflecting portions in different directions toward the smooth emitting surface. The smooth emitting surface is configured to reflect the light reflected by the second flat portions by total reflection and emit the light reflected by the second reflecting portions to the outside.

BRIEF DESCRIPTION OF DRAWINGS

Objects, features and advantages of the present disclosure will become apparent from the following detailed description made with reference to the accompanying drawings. In the drawings:

FIG. 12 is a cross-sectional view illustrating an optical member according to another modification of the first embodiment;

FIG. 13 is a cross-sectional view illustrating an optical member according to a modification of the second embodiment;

FIG. 17 is a cross-sectional view illustrating an optical member according to another modification of the second embodiment.

DETAILED DESCRIPTION

Figure 1:
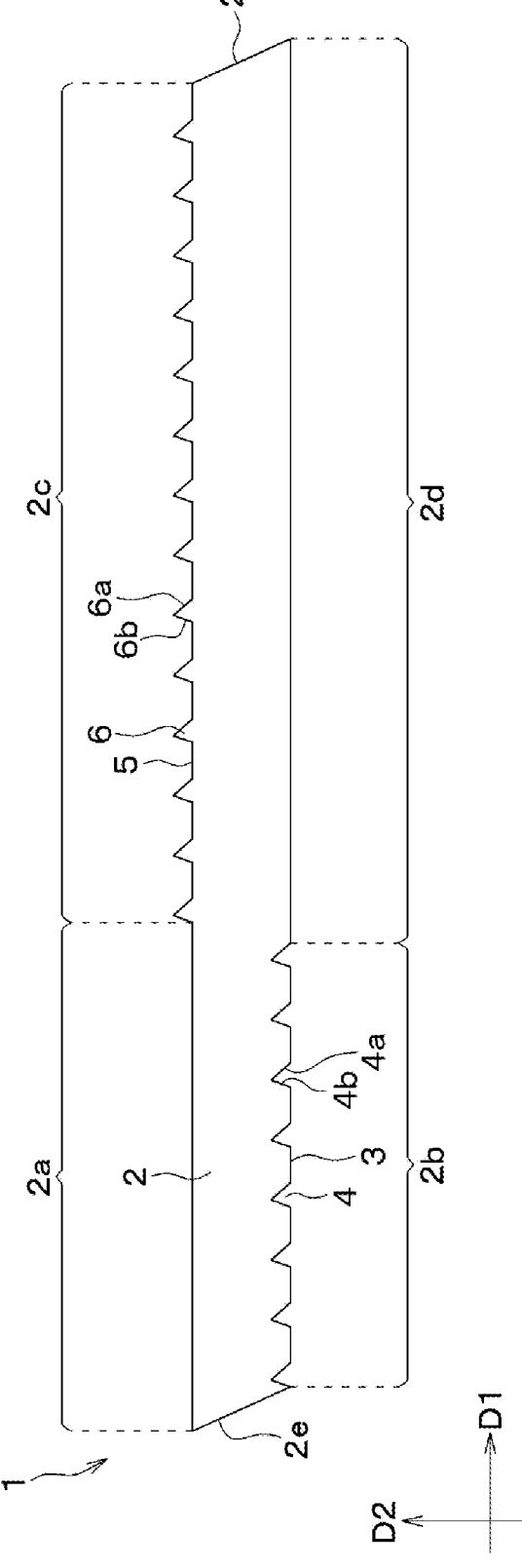
FIG. 1 is a cross-sectional view illustrating an optical member according to a first embodiment.

An optical member according to a comparative example includes a light guide body having an incident surface from which external scene light enters, a first surface to which the external scene light entering from the incident surface is directed first, and a second surface facing the first surface, a semi-transmissive mirror disposed adjacent to the first surface, and a mirror disposed on the second surface.

In the optical member, a part of the external scene light entering from the incident surface is reflected to the second surface by the semi-transmissive mirror, the remaining part is absorbed or transmitted by the semi-transmissive mirror, and the light reflected by the semi-transmissive mirror is reflected by the second surface toward the first surface. In the optical member, a prism sheet having a plurality of prisms is disposed on the first surface, and a light transmitted through the semi-transmissive mirror is emitted to the outside through the plurality of prisms.

This type of optical member is required to be thinned while securing a wide region for allowing a user to visually recognize an external scene in an emitting surface of the light guide body from which external scene light is emitted to the outside. An angle at which the external scene light travels toward the incident surface of the light guide body is referred to as an incident angle, and an angle at which the incident light travels toward the second surface is referred to as a light guide angle. In order to satisfy the above requirement, the light guide angle needs to be larger than the incident angle, and a distance that the incident light travels in one round trip between the first surface and the second surface needs to be as large as possible.

However, there is a limit to increase the light guide angle by one refraction on the incident surface. Although it is conceivable to change the inclination angle of the incident surface, the reflection of the external scene light on the incident surface increases, and the efficiency decreases due to the loss of light rays.

An optical member according to an aspect of the present disclosure includes a light guide body that includes a smooth incident surface, a reflecting and emitting surface, a reflecting surface, and a smooth emitting surface. The smooth incident surface is a surface from which an external scene light enters. The reflecting and emitting surface is disposed to face the smooth incident surface. The reflecting and emitting surface includes a plurality of first flat portions and a plurality of first reflecting portions that are repeatedly and alternately arranged. The plurality of first flat portions is configured to emit a part of an incident light that is the external scene light entering from the smooth incident surface to an outside of the light guide body. The plurality of first reflecting portions is configured to reflect another part of the incident light. The reflecting surface includes a plurality of second flat portions and a plurality of second reflecting portions configured to reflect a light that is the another part of the incident light reflected by the plurality of first reflecting portions. The smooth emitting surface is disposed to face the reflecting surface. The smooth incident surface and the reflecting surface are continuously arranged. The reflecting and emitting surface and the smooth emitting surface are continuously arranged. The plurality of second flat portions and the plurality of second reflecting portions are configured to reflect the light reflected by the plurality of first reflecting portions in different directions toward the smooth emitting surface. The smooth emitting surface is configured to reflect the light reflected by the plurality of second flat portions by total reflection and emit the light reflected by the plurality of second reflecting portions to the outside.

According to this configuration, the optical member is configured such that the smooth incident surface and the reflecting and emitting surface are disposed to face each other, the plurality of first reflecting portions in the reflecting and emitting surface reflects the incident light from the smooth incident surface, and the reflected light is directed toward the reflecting surface disposed continuously with the smooth incident surface. The optical member further includes the smooth emitting surface disposed to face the reflecting surface, and the reflecting surface includes the plurality of second reflecting portions and the plurality of second flat portions that reflect the light reflected by the plurality of first reflecting portions in different directions toward the smooth emitting surface. In this optical member, since a part of the incident light from the smooth incident surface is reflected by the plurality of first reflecting portions alternately arranged with the plurality of first flat portions facing the smooth incident surface, the incident angle of the incident light to the plurality of first reflecting portions is large while restricting surface reflection of the light on the smooth incident surface. Since the reflected light from the plurality of first reflecting portions travels toward the reflecting surface arranged continuously with the smooth incident surface, the incident angle of the reflected light on the reflecting surface is kept large. That is, in the inside of the light guide body, the distance that the incident light travels in one round trip between a side of the smooth incident surface and the reflecting surface and a side of the reflecting and emitting surface and the smooth emitting surface is increased, and a region where a user visually recognizes an external scene on the side of the reflecting and emitting surface can be widened, and the light guide body can be thinned by this amount. Therefore, the optical member is reduced in thickness while securing a wide region for allowing the user to visually recognize the external scene.

The following describes embodiments of the present disclosure with reference to the drawings. In the following embodiments, the same or equivalent parts are denoted by the same reference numerals for description.

First Embodiment

Figure 2:
FIG. 2 is an explanatory diagram for explaining optical guiding in the optical member according to the first embodiment.
Figure 2:
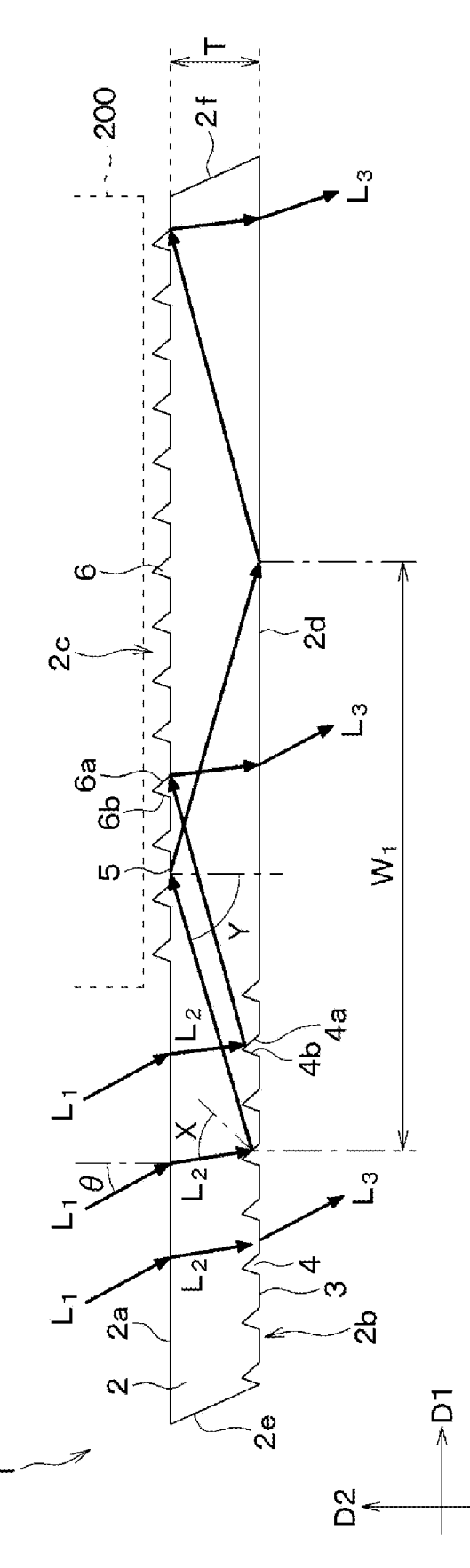

An optical member 1 according to a first embodiment of the present disclosure will be described with reference to the drawings. The optical member 1 of the present embodiment can be used, for example, as a blind area assistance device that is attached to a member, an obstacle, or the like that blocks the field of view of a user and causes a blind area, and allows the user to visually recognize a scene in the blind area. In the present specification, a case where the optical member 1 is attached to a pillar of a vehicle and is used as a blind area assistance device for a vehicle that guides an external scene light from a blind area due to the pillar toward a user and causes the user to visually recognize an external scene in the blind area will be described as a representative example, but the optical member 1 can be adopted to other applications as a matter of course. In FIG. 2, in order to make the configuration of the optical member 1 easy to see, the outline of a shielding body 200 described later is indicated by a broken line.

Figure 3:
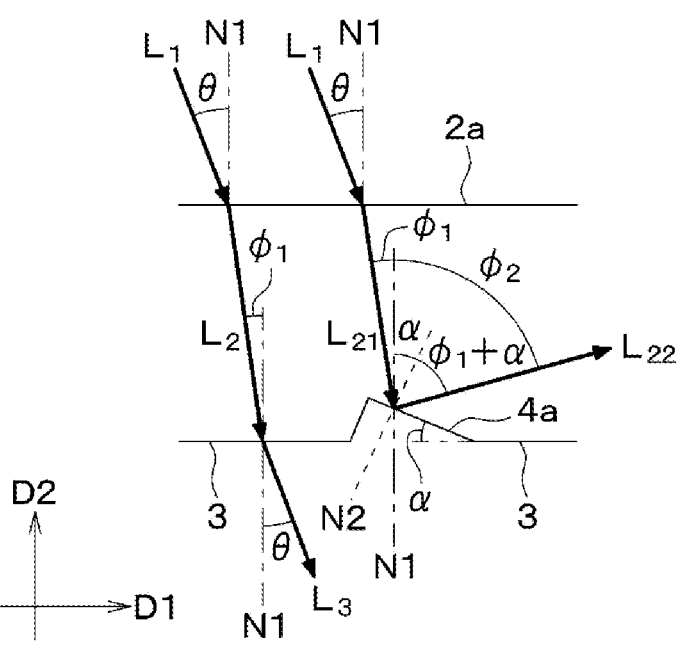
FIG. 3 is an explanatory diagram for explaining reflection of an incident light at a first reflecting portion in a reflecting and emitting surface.

As illustrated in FIG. 1, for example, the optical member 1 includes a light guide body 2 having a substantially plate-shape. The light guide body 2 is made of any translucent material such as polyethylene terephthalate, polycarbonate, polyethylene, or acrylic. The light guide body 2 includes a smooth incident surface 2a from which an external scene light from the outside enters the light guide body 2, a reflecting and emitting surface 2b disposed to face the smooth incident surface 2a, a reflecting surface 2c located on the opposite side of the reflecting and emitting surface 2b together with the smooth incident surface 2a, and a smooth emitting surface 2d disposed to face the reflecting surface 2c. The light guide body 2 further includes an incident side surface 2e connecting the smooth incident surface 2a and the reflecting and emitting surface 2b, and an end surface 2f connecting the reflecting surface 2c and the smooth emitting surface 2d. For example, as illustrated in FIG. 2 and FIG. 3, the optical member 1 is attached to the shielding body 200 that shields light with a jig or the like (not illustrated). The optical member 1 causes the external scene light to enter the inside of the light guide body 2 from the smooth incident surface 2a located at a portion protruding from the shielding body 200. In the optical member 1, while a part of the incident light is reflected and guided by a part of the reflecting and emitting surface 2b, the reflecting surface 2c, and the smooth emitting surface 2d in this order, other parts of the incident light are emitted to the outside by the reflecting and emitting surface 2b and a part of the smooth emitting surface 2d. As a result, the optical member 1 allows a user facing the reflecting and emitting surface 2b and the smooth emitting surface 2d to visually recognize an external scene of the blind area generated by the shielding body 200. Note that the shielding body 200 is, for example, a pillar for in-vehicle use, but is not limited to this example, and various shielding bodies can be used depending on the use.

Hereinafter, for convenience of description, for example, as illustrated in FIG. 2, a light incident on the light guide body 2 from the outside is referred to as an "external scene light $L_1$", and a light that enters the inside of the light guide body 2 from the smooth incident surface 2*a* in the external scene light L₁ is referred to as an "incident light L₂". In addition, a light emitted to the outside from the reflecting and emitting surface 2*b* and the smooth emitting surface 2*d* is referred to as an "emitted light L₃".

In addition, as illustrated in FIG. 1 and the like, a direction along a plane formed by a plurality of first flat portions 3 in the reflecting and emitting surface 2*b*, which is a direction from an end portion adjacent to the incident side surface 2*e* toward an end portion adjacent to the end surface 2*f*, is referred to as a "light guide direction D1", and a normal direction with respect to the plane is referred to as a "thickness direction D2". That is, the light guide direction D1 can also be said to be a direction along a traveling direction of the incident light L₂ in the light guide body 2, and the thickness direction D2 can also be said to be a normal direction with respect to second flat portions 5 parallel to the first flat portions 3. In addition, as illustrated in FIG. 3 and the like, a normal direction with respect to a plane formed by the smooth incident surface 2*a*, the first flat portions 3, the second flat portions 5, or the smooth emitting surface 2*d* may be simply referred to as a "normal direction N1". In addition, when an angle formed by the traveling direction of the external scene light L₁ toward the smooth incident surface 2*a* and the thickness direction D2 is θ, θ may be referred to as an "incident angle". Furthermore, the incident angle of the incident light L₂ to each of first reflecting portions 4*a*, the second flat portions 5, second reflecting portions 6*a*, and the smooth emitting surface 2*d* may be referred to as a "light guide angle".

The smooth incident surface 2*a* is one smooth surface that causes the external scene light L₁ to enter the inside of the light guide body 2. In the present embodiment, the smooth incident surface 2*a* is disposed continuously with the reflecting surface 2*c*, and is located on the same plane as the second flat portions 5 of the reflecting surface 2*c*. The smooth incident surface 2*a* faces the first flat portions 3 of the reflecting and emitting surface 2*b* and is parallel to the first flat portions 3.

The reflecting and emitting surface 2*b* is a surface that the incident light L₂ from the smooth incident surface 2*a* reaches first, and has the plurality of first flat portions 3 and a plurality of recessed portions 4. The reflecting and emitting surface 2*b* has, for example, a configuration in which the first flat portions 3 and the recessed portions 4 are alternately and repeatedly arranged along the light guide direction D1. In the present embodiment, each of the first flat portions 3 in the reflecting and emitting surface 2*b* is located on the same plane as the smooth emitting surface 2*d*. The reflecting and emitting surface 2*b* having the recessed portions 4 and the first flat portions 3 is formed by, for example, a known plastic molding method using a mold (not illustrated) or the like.

For example, as illustrated in FIG. 2, each of the first flat portions 3 is a smooth surface disposed to face and be parallel to the smooth incident surface 2*a*, and the incident light L₂ from the smooth incident surface 2*a* is incident on each of the first flat portions 3 at an angle less than the critical angle. The incident light L₂ incident on the first flat portions 3 is emitted to the outside.

Each of the recessed portions 4 is provided from the plane formed by the first flat portions 3 toward the inside of the light guide body 2. For example, as illustrated in FIG. 2, each of the recessed portions 4 has a groove shape constituted by two wall surfaces facing each other and intersecting each other in a cross-sectional view, and one of the two wall surfaces is a first reflecting portion 4*a* and the other is a connecting surface 4*b*.

The first reflecting portion 4*a* is, for example, one flat surface, and is one surface of the two wall surfaces of the recessed portion 4 in which a normal direction of the wall surface faces the reflecting surface 2*c*. In other words, the first reflecting portion 4*a* is an inclined surface inclined with respect to the smooth incident surface 2*a* so as to face the reflecting surface 2*c*. The first reflecting portion 4*a* is, for example, a portion that functions as a first reflecting surface that reflects the incident light L₂ from the smooth incident surface 2*a* toward the reflecting surface 2*c* by total reflection. The connecting surface 4*b* is a surface connecting the first reflecting portion 4*a* and the first flat portion 3 of the two wall surfaces of the recessed portion 4, and is, for example, one flat surface. Details of an inclination angle of the first reflecting portion 4*a* and the reflection of the incident light L₂ will be described later.

The reflecting surface 2*c* is a surface adjacent to the smooth incident surface 2*a*, and is a portion that reflects the reflected light from the reflecting and emitting surface 2*b*. The reflecting surface 2*c* has the plurality of second flat portions 5 and a plurality of prism portions 6. The reflecting surface 2*c* is, for example, a prism array in which the second flat portions 5 and the prism portions 6 are alternately arranged along the light guide direction D1. When the first reflecting portions 4*a* are referred to as first reflecting surfaces, the reflecting surface 2*c* includes the second flat portions 5 and second reflecting portions 6*a* respectively corresponding to second reflecting surfaces and third reflecting surfaces paired with the first reflecting surfaces. The optical member 1 is attached to, for example, the shielding body 200 that shields an external scene such as an A pillar of a vehicle by an attachment jig (not illustrated) or the like, and is used in a mounted state in which the reflecting surface 2*c* and the shielding body 200 face each other with a predetermined gap therebetween. At this time, the smooth incident surface 2*a* protrudes from the shielding body 200 to which the optical member 1 is attached.

In the present embodiment, each of the second flat portions 5 is located on the same plane as the smooth incident surface 2*a*, and reflects light reflected by corresponding one of the first reflecting portion 4*a* to the smooth emitting surface 2*d* by total reflection. Each of the second flat portions 5 is, for example, parallel to the smooth emitting surface 2*d*. Thus, the light reflected by each of the second flat portions 5 travels toward the smooth emitting surface 2*d* at a light guide angle equal to or larger than the critical angle, and is totally reflected by the smooth emitting surface 2*d*. That is, each of the second flat portions 5 is a surface that reflects the light reflected by corresponding one of the first reflecting portions 4*a* at an angle at which the light is totally reflected by the smooth emitting surface 2*d*, that is, a reflecting surface for guiding light inside the light guide body 2, and functions as a so-called "light guide reflecting surface". The details will be described later.

Each of the prism portions 6 is a protrusion protruding outward from the plane formed by the second flat portions 5, and has, for example, a triangular shape in a cross-sectional view. Each of the prism portions 6 has two surfaces facing each other and intersecting each other, one of which is the second reflecting portion 6*a* that reflects the light reflected by corresponding one of the first reflecting portions 4*a*, and the other of which is an adjacent surface 6*b*.

In the present embodiment, each of the second reflecting portions 6*a* is a flat surface parallel to the first reflecting portions 4*a*, and reflects the light reflected by corresponding one of the first reflecting portions 4*a* to the smooth emitting surface 2*d* by total reflection. Each of the second reflecting portions 6*a* reflects the light reflected by corresponding one of the first reflecting portions 4*a* toward the smooth emitting surface 2*d* in a direction different from that of the light reflected by each of the second flat portions 5. The light reflected by the plurality of second reflecting portions 6*a* travels toward the smooth emitting surface 2*d* at a light guide angle less than the critical angle, and is emitted from the smooth emitting surface 2*d* to the outside. That is, each of the second reflecting portions 6*a* is a surface that reflects the light reflected by corresponding one of the first reflecting portions 4*a* at an angle at which the light is not totally reflected by the smooth emitting surface 2*d*, that is, a reflecting surface used for emission from the smooth emitting surface 2*d*, and functions as a so-called "emission reflecting surface". The details will be described later.

The smooth emitting surface 2*d* is a smooth surface that is disposed continuously with the reflecting and emitting surface 2*b* and is parallel to the smooth incident surface 2*a* and the second flat portions 5. The smooth emitting surface 2*d* is disposed to face the reflecting surface 2*c*, and the reflected light mainly from the reflecting surface 2*c* enters the smooth emitting surface 2*d*. The smooth emitting surface 2*d* reflects the reflected light from the second flat portions 5 toward the reflecting surface 2*c* and emits the reflected light from the second reflecting portions 6*a* to the outside.

The incident side surface 2*e* is a side surface connecting the smooth incident surface 2*a* and the reflecting and emitting surface 2*b*. The incident side surface 2*e* has, for example, an inclination angle with respect to the thickness direction D2 of a predetermined value or less so that the incident light L₂ is not incident.

The end surface 2*f* is a side surface that is located at the end in the light guide direction D1 and connects the reflecting surface 2*c* and the smooth emitting surface 2*d*. In the incident light L₂, a light that has reached the end surface 2*f* is emitted to the outside, for example, but may not be emitted to the outside by covering the end surface 2*f* with a light absorbing film (not illustrated).

The above is the basic configuration of the light guide body 2. The light guide body 2 can guide the incident light L₂ inside thereof without having a semi-transmissive mirror made of, for example, a metal material or a dielectric material, and has a configuration in which a loss due to absorption of the incident light L₂ does not occur at the first flat portions 3 and the smooth emitting surface 2*d*.

[Light Guiding in Optical Member]

Next, light guiding by the reflecting and emitting surface 2*b*, the reflecting surface 2*c*, and the smooth emitting surface 2*d* will be described.

The light guide body 2 is designed such that the incident light L₂ is totally reflected by the first reflecting portions 4*a*, the second flat portions 5 and the second reflecting portions 6*a* of the reflecting surface 2*c*, and the light reflected by the second flat portions 5 is totally reflected by the smooth emitting surface 2*d* and is guided inside the light guide body 2. Specifically, the refractive index of the constituent material of the light guide body 2 is set as n (>1), and the outside of the light guide body 2 is assumed to be air (refractive index: 1). The light guide angle at the first reflecting portions 4*a* is set as X, and the light guide angle at the second flat portions 5 is set as Y. At this time, the light guide body 2 is designed to satisfy the following mathematical formulas (1) and (2).

$$\sin X \geq 1/n \qquad (1)$$
$$\sin Y \geq 1/n \qquad (2)$$

In the light guide body 2, the first reflecting portions 4*a* and the second reflecting portions 6*a* have the same inclination angle with respect to a horizontal plane whose normal direction is the thickness direction D2, that is, are parallel to each other. In the light guide body 2, the smooth incident surface 2*a* and the second flat portions 5 are located on the same plane, and the smooth incident surface 2*a* and the smooth emitting surface 2*d* are parallel to each other. Therefore, the light guide angle at the second reflecting portions 6*a* is X, the light guide angle at the second flat portions 5 is Y, and the light guide angle at the smooth emitting surface 2*d* of the light reflected by the second reflecting portions 6*a* is X.

Accordingly, the light guide body 2 can emit the incident light L₂ from the first flat portion 3 and the smooth emitting surface 2*d* to the outside while guiding the incident light L₂ from the smooth incident surface 2*a* inside thereof by total reflection without having a semi-transmissive mirror and a mirror made of a material different from a material of the light guide body 2.

For example, as illustrated in FIG. 3, when the external scene light L₁ is incident on the smooth incident surface 2*a* at the incident angle θ, a light guide angle of the incident light L₂ to the first flat portions 3 is set as φ₁. When the external scene light L₁ is incident on the light guide body 2 having a refractive index n from an external air layer (refractive index: 1), 1×sin θ=n×sin φ₁ is established according to Snell's law, and the light guide angle φ₁ is determined by the incident angle θ and the refractive index of the light guide body 2. For example, when the light guide body 2 is made of a polymethyl methacrylate (PMMA) resin having a refractive index of 1.49 and the incident angle θ=30°, the light guide angle φ₁ is about 19.6° from 1×sin 30°=1.49×sin φ₁. In the incident light L₂, a light reaching the first flat portions 3 at the light guide angle φ₁ is emitted to the outside at an angle equal to the incident angle θ when the smooth incident surface 2*a* and the first flat portions 3 are parallel to each other. As a result, the continuity between the external scene directly visible to the user and the external scene visible through the light guide body 2 is maintained.

Figure 4:
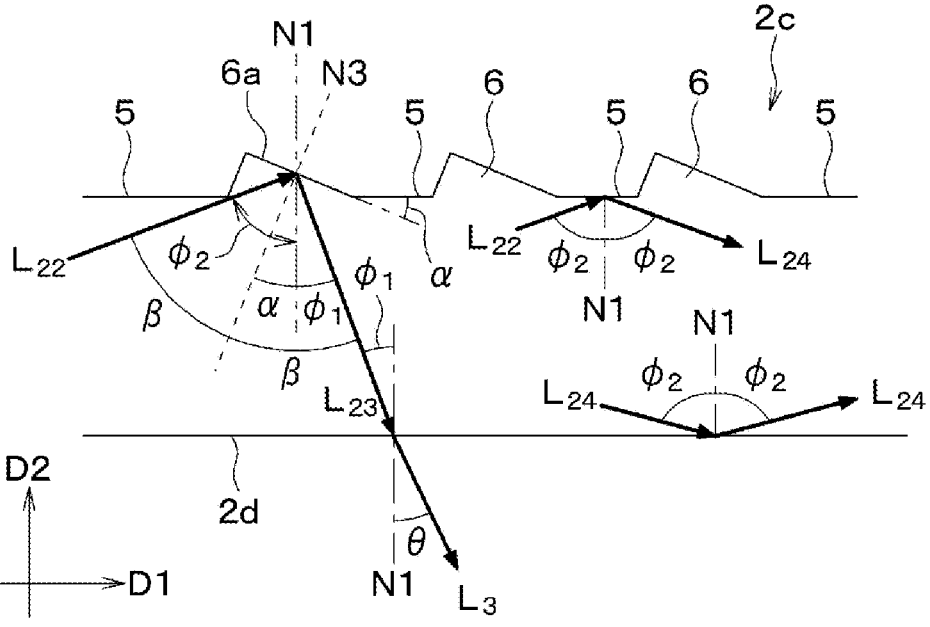
FIG. 4 is an explanatory diagram for explaining reflection of the incident light at a second reflecting portion in a reflecting surface.

For example, as illustrated in FIG. 3, the first reflecting portion 4*a* is an inclined surface, and an angle formed with the first flat portion 3 is α(unit: °). In addition, in the incident light L₂, a light incident on the first reflecting portion 4*a* is set as first incident light L₂₁, the first incident light L₂₁ reflected by the first reflecting portion 4*a* is set as a second incident light L₂₂, and an angle formed by a traveling direction of the second incident light L₂₂ and the normal direction N1 is set as φ₂. When the smooth incident surface 2*a* and the second flat portions 5 are parallel to the first flat portions 3, φ₂ is equal to the light guide angle Y to the second flat portions 5, for example, as illustrated in FIG. 2 and FIG. 4. When the inclination angle of the first reflecting portion 4*a* is α, the angle formed by the normal direction N1 and the normal direction N2 with respect to the plane formed by the first reflecting portion 4*a* is α as illustrated in FIG. 3. Therefore, the light guide angle X of the first incident light L₂₁ with respect to the first reflecting portion 4*a* is φ₁+α. Since the angle between the normal direction N2 and the traveling direction of the second incident light L₂₂ is φ₁+a according to the law of reflection, the light guide angle φ₂ is $\varphi_1+\alpha+\alpha$, that is, $\varphi_1+2\alpha$. As described above, the smooth incident surface $2a$ and the first flat portion 3 face each other and are parallel to each other, and the first reflecting portion $4a$ is inclined with respect to the smooth incident surface $2a$, so that the light guide angle $\varphi_2$ (=Y) can be increased.

For example, as illustrated in FIG. 4, the second incident light $L_{22}$ reaches the second flat portion 5 or the second reflecting portion $6a$ of the reflecting surface $2c$. The second reflecting portion $6a$ is parallel to the first reflecting portion $4a$, that is, an inclined surface having an inclination angle $\alpha$ with respect to the second flat portion 5. At this time, a part of the second incident light $L_{22}$ is totally reflected by the second reflecting portion $6a$ and travels toward the smooth emitting surface $2d$ at the light guide angle $\varphi_1$. In the second incident light $L_{22}$, a third incident light $L_{23}$ reflected by the second reflecting portion $6a$ reaches the smooth emitting surface $2d$ at an angle less than the critical angle, and is emitted to the outside at the same angle as the incident angle $\theta$. When the first reflecting portion $4a$ and the second reflecting portion $6a$ are parallel to each other, that is, the inclination angles are the same, the normal direction N3 with respect to the second reflecting portion $6a$ is parallel to the normal direction N2. At this time, a light guide angle $\beta$ of the second incident light $L_{22}$ to the second reflecting portion $6a$ is equal to X and is $\varphi_1+\alpha$.

On the other hand, the second incident light $L_{22}$ that has reached the second flat portion 5 is incident at the light guide angle $\varphi_2$, and is reflected by total reflection because the light guide body 2 is designed to satisfy the above mathematical formula (2). In the second incident light $L_{22}$, a fourth incident light $L_{24}$ reflected by the second flat portion 5 travels toward the smooth emitting surface $2d$ at a light guide angle $\varphi_2$ equal to or greater than the critical angle, and is reflected by total reflection on the smooth emitting surface $2d$. The fourth incident light $L_{24}$ reflected by the smooth emitting surface $2d$ is directed toward the reflecting surface $2c$ again at the same light guide angle $\varphi_2$ as that of the second incident light $L_{22}$. Therefore, when the fourth incident light $L_{24}$ reaches the second reflecting portion $6a$, the fourth incident light $L_{24}$ is emitted from the smooth emitting surface $2d$, and when the fourth incident light $L_{24}$ reaches the second flat portion 5, the fourth incident light $L_{24}$ is reflected by the smooth emitting surface $2d$ again.

[Thinning of Optical Member]

Figure 5:
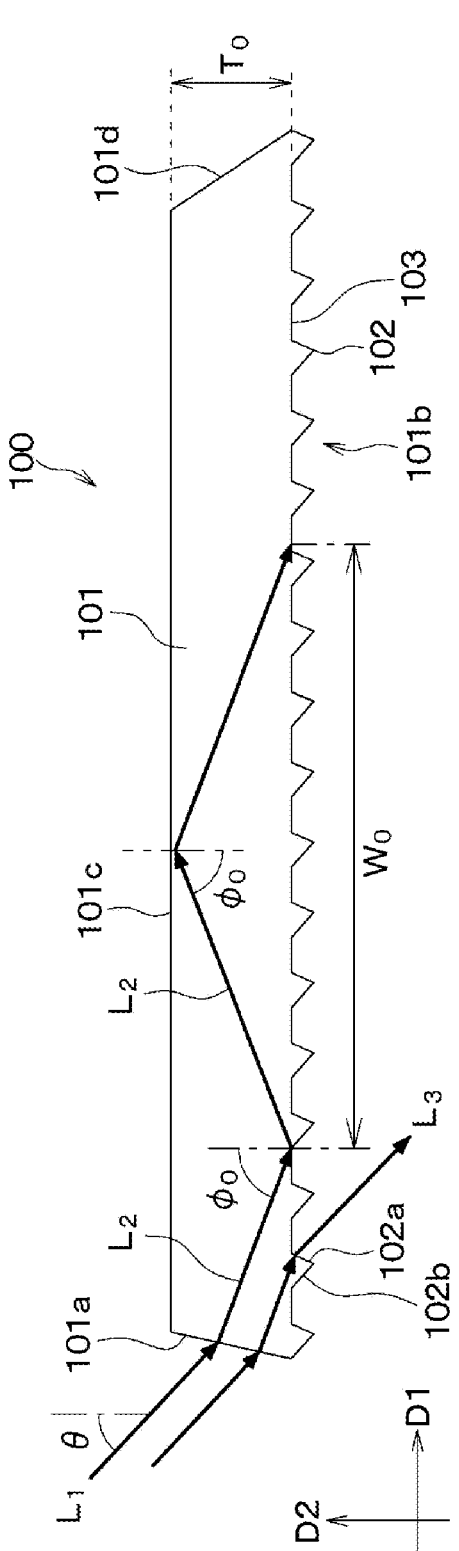
FIG. 5 is an explanatory diagram for explaining an optical member and optical guiding according to a comparative example.

From the viewpoint of reducing the thickness T of the light guide body 2, the inclination angle $\alpha$ of the first reflecting portion $4a$ is preferably designed so that, for example, the light guide angle $\varphi_2$ to the second flat portion 5 is 70° or more, that is, $\varphi_1+2\alpha\geq70$ is satisfied. The reason for this will be described in comparison with an optical member 100 according to a comparative example illustrated in FIG. 5.

First, differences between the optical member 100 of the comparative example and the optical member 1 will be mainly described. The optical member 100 of the comparative example includes a light guide body 101 formed of a material having a predetermined refractive index and translucency, and is configured to guide the external scene light $L_1$ by total reflection without including a semi-transmissive mirror or a mirror formed of another material. The optical member 100 includes an incident surface $101a$, an emitting surface $101b$, a reflecting surface $101c$, and an end surface $101d$. The emitting surface $101b$ and the reflecting surface $101c$ are arranged in parallel and face each other, and the incident surface $101a$ and the end surface $101d$ face each other. The emitting surface $101b$ is formed by repeatedly arranging a prism portion 102 having a surface for emitting the incident light $L_2$ to the outside and a flat portion 103 for reflecting the incident light $L_2$ by total reflection. The prism portion 102 includes an emission portion $102a$ that emits the incident light $L_2$ to the outside, and an adjacent surface $102b$ that is adjacent to the flat portion 103 adjacent to the incident surface $101a$. The optical member 100 has a configuration in which the incident light $L_2$ enters from the incident surface $101a$ intersecting the emitting surface $101b$, the incident light $L_2$ is incident and reflected at the flat portion 103 at the light guide angle $\varphi_0$, then the incident light $L_2$ is incident and reflected at the reflecting surface $101c$ at the light guide angle $\varphi_0$, and returns to the emitting surface $101b$.

Here, the thickness of a portion of the emitting surface $101b$ of the optical member 100 where the flat portion 103 and the reflecting surface $101c$ face each other is set as $T_0$. At this time, in the optical member 100, a reciprocating width $W_0$ is $2T_0 \tan \varphi_0$, where the reciprocating width $W_0$ is a distance by which the incident light $L_2$ travels along the light guide direction D1 in one reciprocation between the flat portion 103 and the reflecting surface $101c$ by total reflection. In order to secure a wide area for allowing the user to visually recognize the external scene on the emitting surface $101b$, it is necessary to increase the reciprocating width $W_0$. In order to increase the reciprocating width $W_0$, it is necessary to increase the thickness $T_0$ or increase the light guide angle $\varphi_0$.

However, increasing the thickness $T_0$ is contrary to the requirement for thinning. In addition, in order to increase the light guide angle $\varphi_0$ (preferably, 70° or more), it is necessary to adjust the inclination angle of the incident surface $101a$ so that the angle formed by the normal direction with respect to the incident surface $101a$ and the incident direction of the external scene light $L_1$, that is, the incident light angle increases. Here, the inclination angle of the incident surface $101a$ is an angle formed by a plane formed by the incident surface $101a$ and a plane formed by the flat portion 103. For example, when the light guide body 101 is made of PMMA resin having a refractive index of 1.49 and the incident light angle is 60°, the angle formed by the traveling direction of the incident light $L_2$ from the incident surface $101a$ and the normal direction to the incident surface $101a$ is about 24.5° according to Snell's law. When the angle between the normal direction to the flat portion 103 and the external scene light $L_1$, that is, the incident angle $\theta=30°$, the light guide angle $\varphi_0$ is 30°+ about 24.5°=about 54.5°, which does not reach 70°. Therefore, in order to set the light guide angle $\varphi_0$ to 70° or more, it is necessary to design the inclination angle of the incident surface $101a$ so that the incident light angle of the external scene light $L_1$ is larger than 60°. However, when the inclination angle of the incident surface $101a$ is designed in this manner, the light guide angle $\varphi_0$ can be increased, but the reflectance of the external scene light $L_1$ on the incident surface $101a$ increases, and a loss of light rays occurs.

Figure 6:
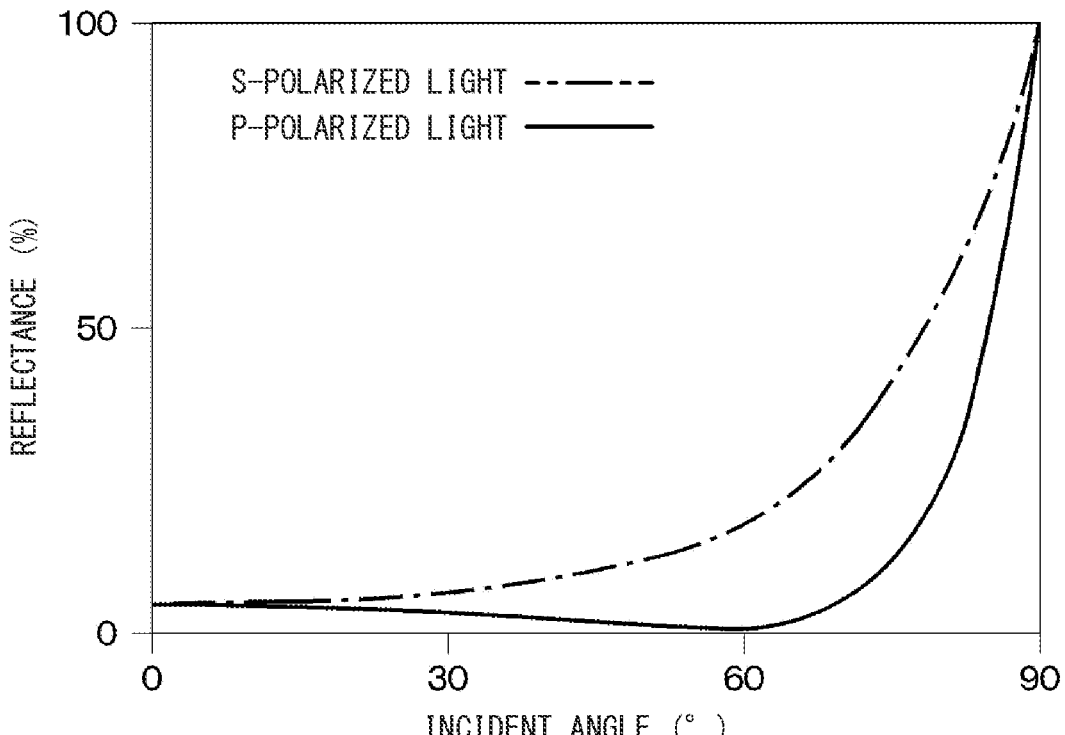
FIG. 6 is a graph illustrating a relationship between an incident angle of light on an incident surface and a reflectance.

According to the study by the present inventors, the relationship between the incident angle of light with respect to the incident surface and the reflectance of light on the incident surface is as illustrated in FIG. 6, for example. Specifically, a change in reflectance when the incident angle was changed was checked for a P-wave component having a vibration direction parallel to the incident surface and an S-wave component having a vibration direction perpendicular to the incident surface among light incident on the incident surface. The "P-polarized light" illustrated in FIG. 6 corresponds to the above-described P-wave component, and the "S-polarized light" illustrated in FIG. 6 corresponds to the above-described S-wave component. The reflectance of the S-polarized light was larger than that of the P-polarized light. However, when the incident angle was 60° or less, the reflectance of both the P-polarized light and the S-polarized light was less than 30%, whereas when the incident angle exceeded 60°, the reflectance rapidly increased. This result means that when the incident angle of light to the incident surface exceeds 60°, the efficiency of taking light from the incident surface into the inside of the light-transmitting body decreases. That is, in the optical member 100 of the comparative example, when the inclination angle of the incident surface 101a is adjusted so that the incident angle of the external scene light $L_1$ on the incident surface 101a exceeds 60°, the reflectance of the external scene light $L_1$ on the incident surface 101a increases, and the efficiency of taking in light from the incident surface 101a decreases. As described above, in the optical member 100 of the comparative example, when the light guide angle $\varphi_0$ is increased in order to reduce the thickness $T_0$ while securing a wide reciprocating width $W_0$, the efficiency of taking in light from the incident surface 101a decreases, and the loss of light increases. For this reason, in the optical member 100 of the comparative example, when a visual recognition region of the external scene light of the user on the emitting surface 101b, that is, a display visual region is secured and the thickness $T_0$ is reduced, a new issue that the light amount of the emitted light $L_3$ is reduced occurs.

In contrast, in the optical member 1 of the present embodiment, the smooth incident surface 2a, which is a portion for taking in the external scene light $L_1$, and the first flat portions 3 and the smooth emitting surface 2d, which are portions for emitting the incident light $L_2$ to the outside, face each other and are parallel to each other. In addition, the optical member 1 is configured such that the first reflecting portions 4a, which are portions that first reflect the incident light $L_2$, are inclined by a with respect to the plane formed by the smooth incident surface 2a. Therefore, as described above, the incident light $L_2$ reflected by the first reflecting portions 4a is guided to the second flat portions 5 at the light guide angle $Y=\varphi_2=\varphi_1+2\alpha$, and the light guide angle $\varphi_2$ can be controlled by adjusting the inclination angle $\alpha$. In other words, since the optical member 1 can adjust the light guide angle $\varphi_2$ without adjusting the incident angle of the external scene light $L_1$ on the smooth incident surface 2a, the optical member 1 can increase the light guide angle $\varphi_2$ while reducing the reflectance of the external scene light $L_1$ on the smooth incident surface 2a. For example, when the incident angle $\theta$ of the external scene light $L_1$ on the smooth incident surface 2a is 30° and the refractive index of the light guide body 2 is 1.49, the light guide angle $\varphi_1$ is about 19.6°, and in order to set the light guide angle $\varphi_2$ to 70°, the inclination angle $\alpha$ may be set to about 25.2° From $70°=19.6°+2\alpha$.

In addition, the reciprocating width $W_1$ is 2T tan $\varphi_2$, where the reciprocating width $W_1$ is a distance by which the incident light $L_2$ travels along the light guide direction D1 in one reciprocation between the reflecting and emitting surface 2b and the reflecting surface 2c due to total reflection. Even when the optical member 1 is designed such that the light guide angle $\varphi_2$ is larger than $\varphi_0$, the reflectance on the smooth incident surface 2a is small, and the light loss is restricted. Therefore, when $W_0=W_1$, $2T_0$ tan $\varphi_0=2T$ tan $\varphi_2$, and when $\varphi_0<\varphi_2$, tan $\varphi_0<$tan $\varphi_2$ and $T_0>T$ are satisfied. That is, when the reciprocating width $W_1$ is the same as the reciprocating width $W_0$ of the optical member 100 of the comparative example, the thickness T of the optical member 1 is smaller than the thickness $T_0$ of the comparative example.

According to the present embodiment, the optical member 1 is configured such that the smooth incident surface 2a and the reflecting and emitting surface 2b face each other and are parallel to each other, and the reflecting surface 2c and the smooth emitting surface 2d face each other and are parallel to each other. In the optical member 1, the first reflecting portions 4a that reflect the incident light $L_2$ from the smooth incident surface 2a in the reflecting and emitting surface 2b are inclined with respect to the smooth incident surface 2a, and the light guide angle $\varphi_2$ of the light reflected by the first reflecting portions 4a to the second flat portions 5 is increased without adjusting the inclination of the smooth incident surface 2a. Thus, the optical member 1 has a configuration in which the reciprocating width of the incident light $L_2$ in the light guide direction D1 is set to be equal to or greater than a predetermined value, and the thickness is reduced while securing a wide viewing region of the external scene light for the user.

Modification of First Embodiment

Figure 7:
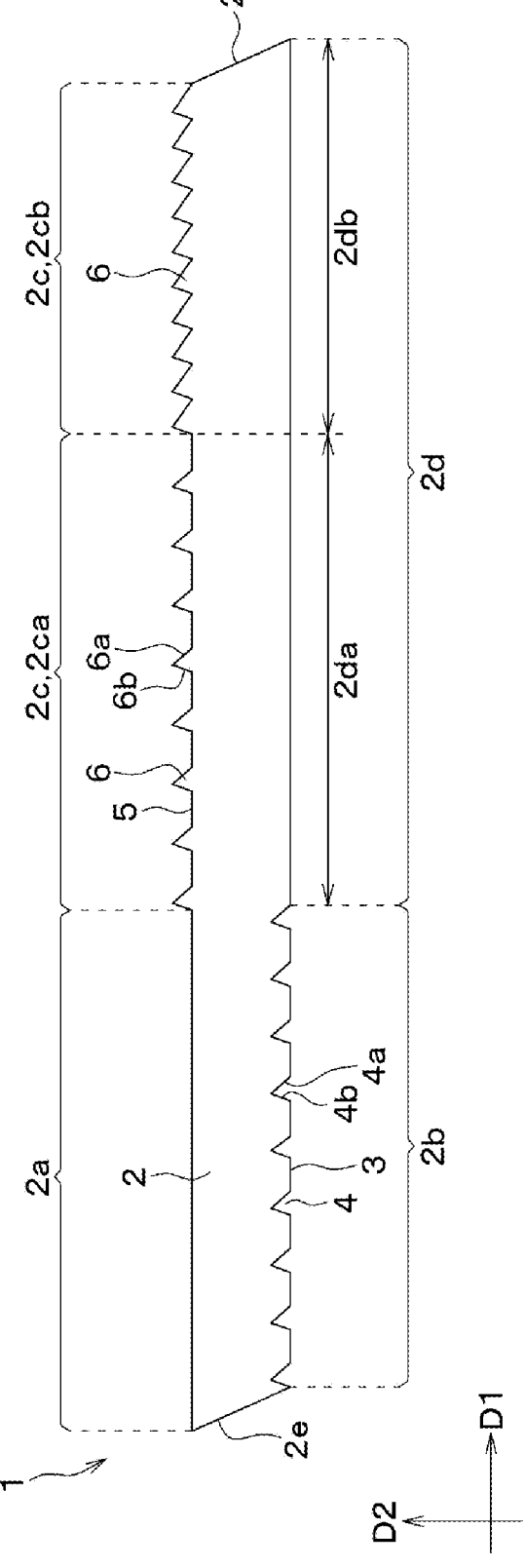
FIG. 7 is a cross-sectional view illustrating an optical member according to a modification of the first embodiment.

In the optical member 1 of the first embodiment, for example, as illustrated in FIG. 7, the reflecting surface 2c may have a plurality of regions having different ratios of the second flat portions 5 and the prism portions 6. For example, the reflecting surface 2c can be configured to have a first region 2ca constituted by a plurality of second flat portions 5 and a plurality of prism portions 6 and a second region 2cb constituted only by a plurality of prism portions 6. In other words, in this case, a surface of the optical member 1 on the same side as the smooth incident surface 2a is divided into three regions of the smooth incident surface 2a, the first region 2ca, and the second region 2cb. Hereinafter, for convenience of description, the number of regions constituting the surface of the optical member 1 on the same side as the smooth incident surface 2a is referred to as "the number of divided regions".

The second region 2cb is formed at an end portion close to the end surface 2f in the light guide direction D1. In addition, in the present modification, the reflecting and emitting surface 2b is designed such that the ratio of the total width of the first flat portions 3 and the first reflecting portions 4a in the light guide direction D1 matches the number of divided regions. With such a configuration, in the optical member 1, the light amount of the emitted light $L_3$ in three regions, that is, a region occupied by the first flat portions 3 in the reflecting and emitting surface 2b, a region facing the first region 2ca in the smooth emitting surface 2d, and a region facing the second region 2cb in the smooth emitting surface 2d, is substantially uniform. The term "substantially uniform" includes not only completely uniform but also nearly uniform.

For example, the total amount of the incident light $L_2$ from the smooth incident surface 2a is set as 100%. In a case where the number of divided regions is three, the optical member 1 is designed such that the amount of the emitted light $L_3$ is about 33% in each of the region occupied by the first flat portions 3 in the reflecting and emitting surface 2b, the region facing the first region 2ca in the smooth emitting surface 2d, and the region facing the second region 2cb in the smooth emitting surface 2d. Hereinafter, for simplification of description, the region facing the first region 2ca in the smooth emitting surface 2d is referred to as a "first facing region 2da", and the region facing the second region 2cb in the smooth emitting surface 2d is referred to as a "second facing region 2db".

Specifically, the emission rate of the incident light $L_2$ to the outside on the reflecting and emitting surface $2b$ is determined by the ratio of the total width of the first flat portions $3$ to the width of the reflecting and emitting surface $2b$ in the light guide direction D1. The reflectance of the incident light $L_2$ on the reflecting and emitting surface $2b$ to the reflecting surface $2c$ is determined by the ratio of the total width of the first reflecting portions $4a$ to the width of the reflecting and emitting surface $2b$ in the light guide direction D1. Therefore, when the ratio of the total width of the first flat portions $3$ to the width of the reflecting and emitting surface $2b$ in the light guide direction D1 is about ⅓ and the ratio of the total width of the first reflecting portions $4a$ to the width of the reflecting and emitting surface $2b$ in the light guide direction D1 is about ⅔, the amount of the emitted light $L_3$ in the region occupied by the first flat portions $3$ in the reflecting and emitting surface $2b$ is 100%×⅓≈33%. The light amount of the emitted light $L_3$ from the first facing region $2da$ is obtained by multiplying the light amount of the reflected light from the first reflecting portions $4a$ by the ratio of the total width of the second reflecting portions $6a$ to the width of the first region $2ca$ in the light guide direction D1. Therefore, the first region $2ca$ is designed such that, for example, the ratio of the total width of the second reflecting portions $6a$ to the width of the first region $2ca$ in the light guide direction D1 is about ½, and the ratio of the total width of the second flat portions $5$ to the width of the first region $2ca$ is about ½. In this case, the light amount of the emitted light $L_3$ from the first facing region $2da$ is 66%×½≈33%. On the other hand, the remaining light (about 33%) reaching the first region $2ca$ is reflected by the second flat portions $5$, then reflected by the smooth emitting surface $2d$, and reaches the second region $2cb$. In the second region $2cb$, reflection by the second reflecting portion $6a$ mainly occurs, and thus the amount of the emitted light $L_3$ from the second facing region $2db$ is about 33%. According to the above design, in all of the reflecting and emitting surface $2b$, the first facing region $2da$, and the second facing region $2db$, the amount of the emitted light $L_3$ is about 33%, and the luminance is substantially uniform.

Although the example in which the reflecting surface $2c$ is configured to have two regions has been described above, the configuration of the reflecting surface $2c$ is not limited to this example. For example, the reflecting surface $2c$ may be configured to have three or more regions having different ratios of the second flat portions $5$ to the prism portions $6$. When the reflecting surface $2c$ is configured to have n (n is an integer of 3 or more) regions, the number of divided regions is n+1, and the number of regions on the same side as the reflecting and emitting surface $2b$ of the optical member $1$ is n+1. At this time, in the optical member $1$, the ratio between the total width of the first flat portions $3$ and the total width of the first reflecting portions $4a$ and the ratio between the total width of the second flat portions $5$ and the total width of the second reflecting portions $6a$ may be adjusted so that the light amount of the emitted light $L_3$ from the reflecting and emitting surface $2b$ and each divided region is about 100/(n+1)%.

This modification also provides the optical member $1$ that can achieve effects similar to those of the first embodiment. In addition, the light amount of the emitted light $L_3$ becomes substantially uniform over the entire area of the reflecting and emitting surface $2b$ and the smooth emitting surface $2d$, and an effect of substantially uniformizing the luminance of the external scene in the display viewing area is also obtained.

Second Embodiment

An optical member $1$ of a second embodiment will be described with reference to the drawings.

Figure 8:
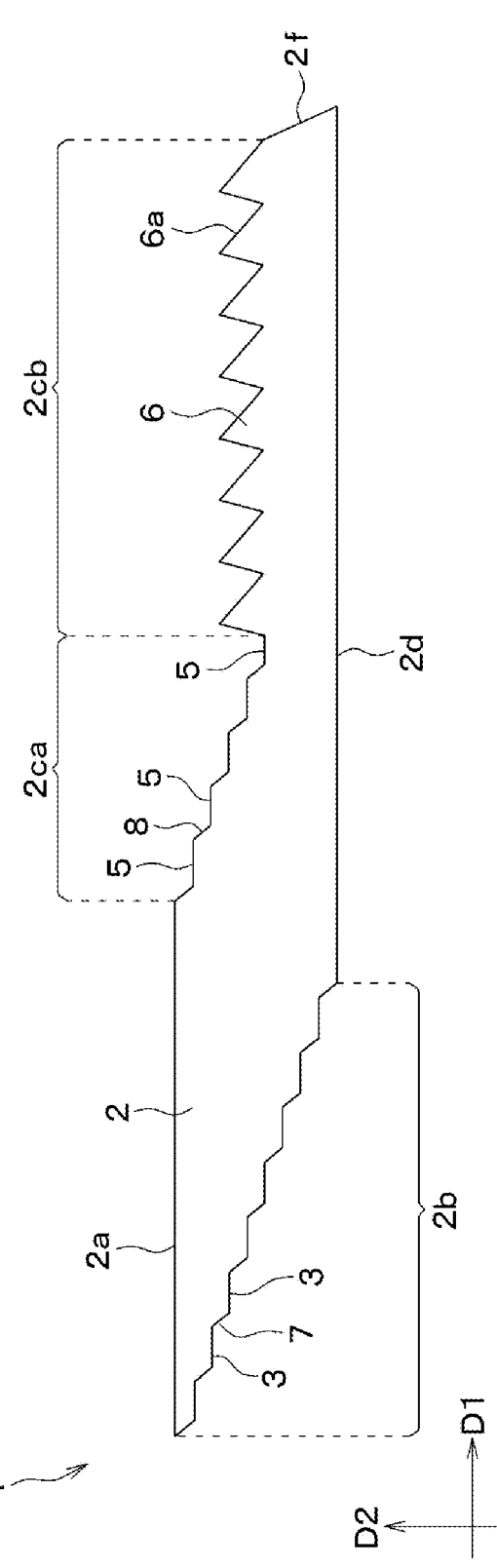
FIG. 8 is a cross-sectional view illustrating an optical member according to a second embodiment.

In the optical member $1$ of the present embodiment, for example, as illustrated in FIG. 8, the reflecting and emitting surface $2b$ has a stepped shape connecting the smooth incident surface $2a$ and the smooth emitting surface $2d$. Furthermore, in the optical member $1$, the reflecting surface $2c$ is configured to have a first region $2ca$ having a stepped shape similar to that of the reflecting and emitting surface $2b$ and a second region $2cb$ having a plurality of prism portions $6$. The optical member $1$ of the present embodiment is different from that of the first embodiment in the points described above. The following describes the difference between the present embodiment and the first embodiment.

In the present embodiment, the reflecting and emitting surface $2b$ includes a plurality of first flat portions $3$ and a plurality of first step portions $7$ that connect two adjacent first flat portions $3$ or the smooth incident surface $2a$ and the first flat portion $3$ adjacent to the smooth incident surface $2a$. In the present embodiment, for example, the first flat portions $3$ are disposed at different positions in the light guide direction D1 and the thickness direction D2, and face and are parallel to the smooth incident surface $2a$. For example, the first flat portions $3$ are arranged such that the closer to the smooth emitting surface $2d$ in the thickness direction D2, the closer to the end surface $2f$ in the light guide direction D1, and do not overlap with the other first flat portions $3$ in the light guide direction D1. The first step portions $7$ are, for example, flat surfaces, and are inclined at the same angle such that the normal directions of the flat surfaces face the reflecting surface $2c$. That is, in the present embodiment, the reflecting and emitting surface $2b$ has a stepped shape in which the first flat portions $3$ and the step portions $7$ disposed at different positions in the light guide direction D1 and the thickness direction D2 are alternately arranged and inclined to face the reflecting surface $2c$ as a whole.

Figure 9:
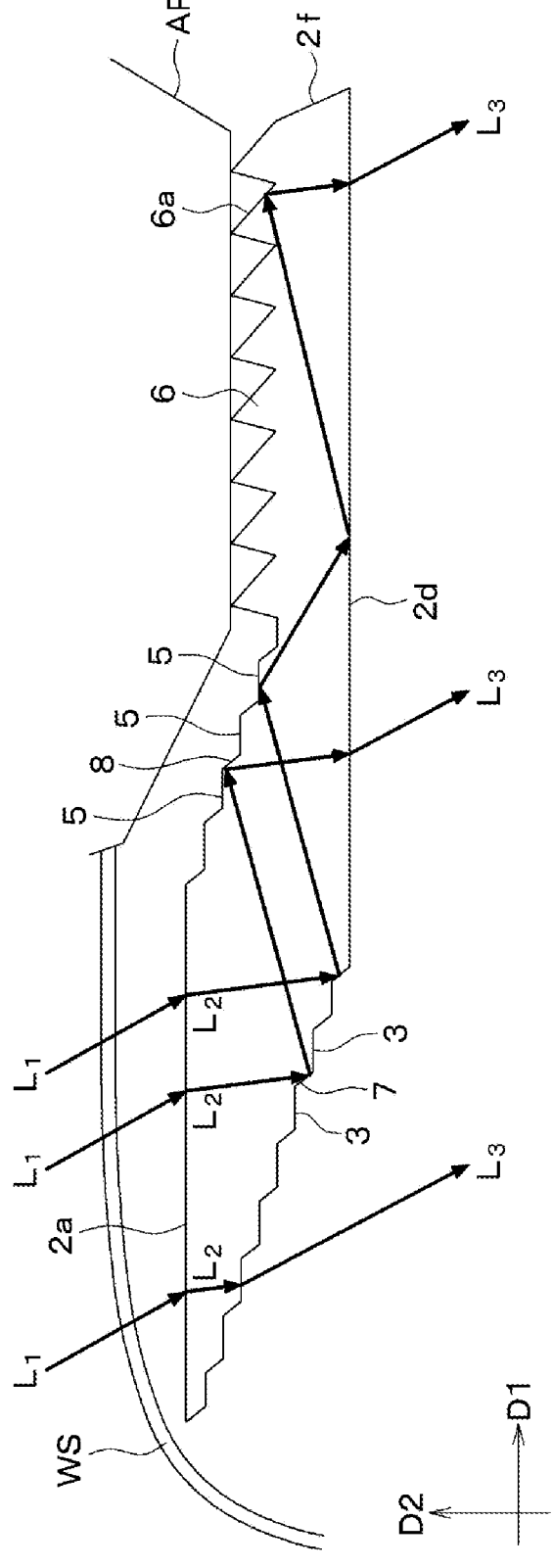
FIG. 9 is an explanatory diagram for explaining an application example and light guiding of the optical member according to the second embodiment.
Figure 10:
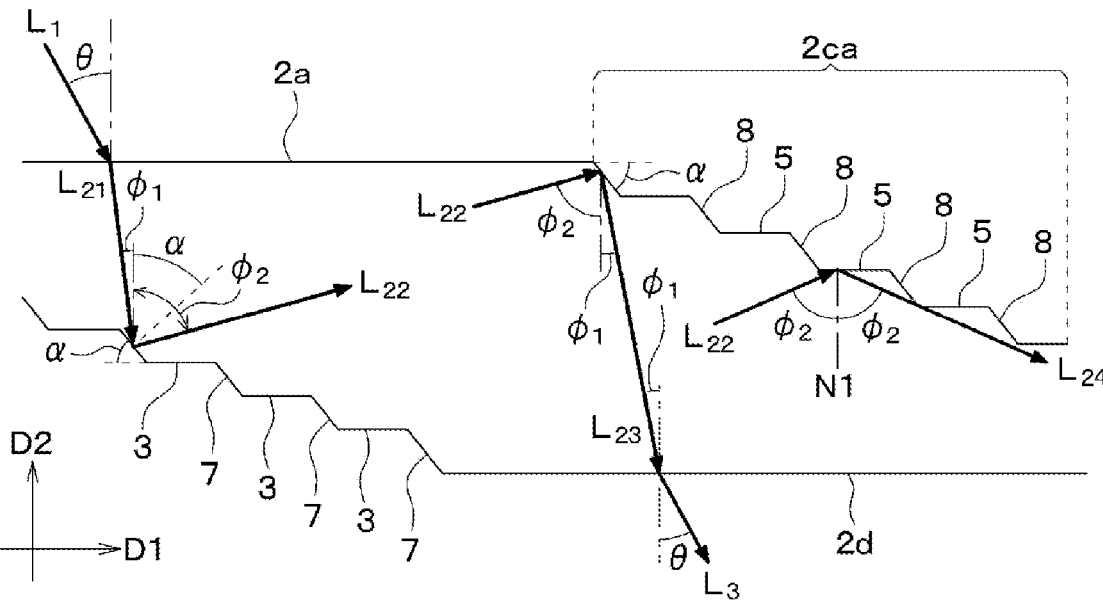
FIG. 10 is an explanatory view for explaining reflection of an incident light on a reflecting and emitting surface and a surface disposed to face to the reflecting and emitting surface.

For example, as illustrated in FIG. 9, the reflecting and emitting surface $2b$ is a portion on which the incident light $L_2$ from the smooth incident surface $2a$ is incident. In the incident light $L_2$ from the smooth incident surface $2a$, the light reaching the first flat portion $3$ is emitted to the outside. In the incident light $L_2$, a light reaching the first step portion $7$ is referred to as first incident light $L_{21}$. For example, as illustrated in FIG. 10, the first step portions $7$ are inclined at an inclination angle $\alpha$ with respect to a plane parallel to the plane formed by the smooth incident surface $2a$ such that the incident angle of the first incident light $L_{21}$ to the first step portions $7$ is equal to or greater than the critical angle. Thus, the first incident light $L_{21}$ is reflected by the first step portions $7$ by total reflection. Then, the second incident light $L_{22}$, which is reflected light from the first step portions $7$, travels toward the first region $2ca$ facing the reflecting and emitting surface $2b$. That is, the first step portions $7$ correspond to the first reflecting portions $4a$ in the first embodiment.

When the incident angle of the external scene light $L_1$ on the smooth incident surface $2a$ is $\theta$, the light guide angle of the first incident light $L_{21}$ with respect to the plane formed by the first flat portion $3$ is $\varphi_1$, and the angle formed by the first incident light $L_{21}$ and the second incident light $L_{22}$ is the light guide angle $\varphi_2$, $\varphi_2=\varphi_1+2\alpha$ is satisfied as in the first embodiment.

In the present embodiment, the first region $2ca$ includes a plurality of second flat portions $5$ located at different positions in the light guide direction D1 and the thickness direction D2, and a plurality of second step portions 8 connecting the smooth incident surface 2a and the second flat portion 5 adjacent to the smooth incident surface 2a or two adjacent second flat portions 5. The second flat portions 5 are arranged such that the closer to the second region 2cb in the thickness direction D2, the closer to the end surface 2f in the light guide direction D1. The first region 2ca has a stepped shape connecting the smooth incident surface 2a and the second region 2cb disposed at a position closer to the smooth emitting surface 2d than the smooth incident surface 2a in the thickness direction D2. That is, the first region 2ca is formed by alternately arranging the second flat portions 5 and the second step portions 8 at different positions in the light guide direction D1 and the thickness direction D2, and has the stepped shape facing the reflecting and emitting surface 2b as a whole. Accordingly, as illustrated in FIG. 9, for example, the optical member 1 can be easily attached to any shielding body having a step such as an A-pillar AP. In this case, the external scene light $L_1$ from a windshield WS is incident on the smooth incident surface 2a. For example, the second flat portions 5 are parallel to the first flat portions 3, and face and are parallel to the smooth emitting surface 2d. The second step portions 8 are, for example, flat surfaces, and are inclined such that the normal directions of the flat surfaces face the reflecting and emitting surface 2b.

The second step portions 8 have, for example, the same inclination angle α as that of the first step portions 7, that is, are parallel to the first step portions 7. The inclination angle α of the second step portion 8 is an angle formed by a plane parallel to the plane formed by the smooth incident surface 2a and the plane formed by the second step portion 8. Accordingly, since a part of the second incident light $L_{22}$ is incident on the second step portions 8 at the light guide angle $\varphi_2$ equal to or greater than the critical angle, the second step portions 8 reflect the part of the second incident light $L_{22}$ toward the smooth emitting surface 2d by total reflection. In the second incident light $L_{22}$, the light reflected by the second step portions 8 is referred to as a third incident light $L_{23}$. The third incident light $L_{23}$ is incident on the smooth emitting surface 2d parallel to the smooth incident surface 2a at a light guide angle $\varphi_1$ less than the critical angle. Therefore, the third incident light $L_{23}$ is emitted from the smooth emitting surface 2d to the outside at the same angle as the incident angle θ. That is, the second step portions 8 play the same role as that of the second reflecting portions 6a in the second region 2cb, and correspond to a so-called "emission reflecting surface".

Since a part of the second incident light $L_{22}$ is incident on the second flat portions 5 at the light guide angle $\varphi_2$ equal to or larger than the critical angle, the second flat portions 5 reflect the part of the second incident light $L_{22}$ toward the smooth emitting surface 2d by total reflection. In the second incident light $L_{22}$, the light reflected by the second flat portions 5 is referred to as fourth incident light $L_{24}$. The fourth incident light $L_{24}$ is incident on the smooth emitting surface 2d at the light guide angle $\varphi_2$ equal to or greater than the critical angle. In the present embodiment, the widths of the second flat portions 5 in the light guide direction D1 is appropriately designed according to the height of the adjacent second step portion 8 in the thickness direction D2 so that the fourth incident light $L_{24}$ is less likely to be blocked by the adjacent second step portion 8 located closer to the second region 2cb.

Figure 11:
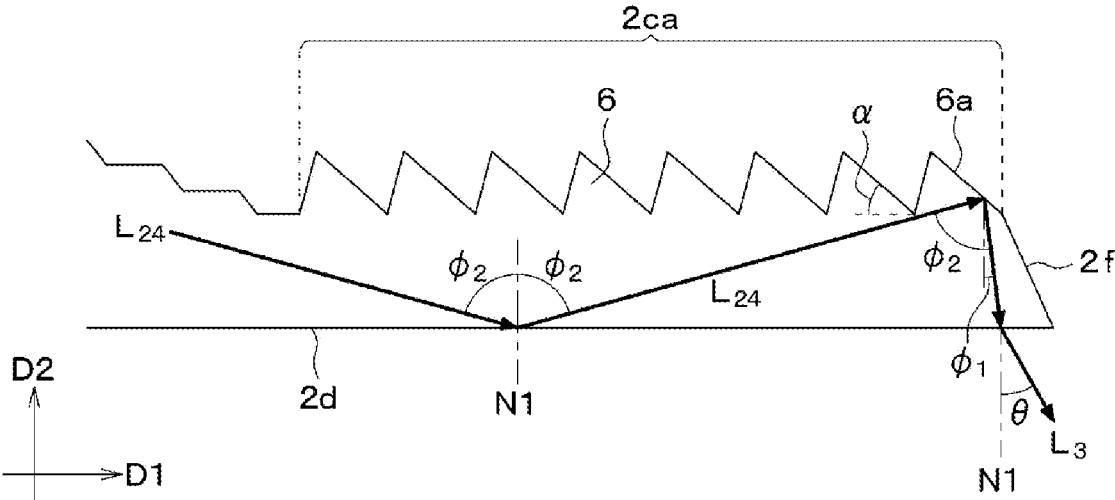
FIG. 11 is an explanatory view for explaining reflection of the incident light on a smooth emitting surface and a second region of a reflecting surface.

For example, as illustrated in FIG. 11, the fourth incident light $L_{24}$ is incident on the smooth emitting surface 2d at the light guide angle $\varphi_2$, and is reflected by the smooth emitting surface 2d toward the second region 2cb by total reflection.

The fourth incident light $L_{24}$ reflected by the smooth emitting surface 2d is mainly incident on the second region 2cb. In the fourth incident light $L_{24}$, the light incident on the second reflecting portions 6a is reflected by total reflection toward the smooth emitting surface 2d at a light guide angle $\varphi_1$ less than the critical angle, and then exits from the smooth emitting surface 2d to the outside at the same angle as the incident angle θ.

The present embodiment also provides the optical member 1 that can achieve effects similar to those of the first embodiment. In addition, since the reflecting and emitting surface 2b is formed in the stepped shape connecting the smooth incident surface 2a and the reflecting and emitting surface 2b, there is no portion that does not optically contribute in the reflecting and emitting surface 2b, and an effect of improving light use efficiency is obtained. In addition, since the reflecting surface 2c is configured to have the first region 2ca and the second region 2cb having the stepped shape, the optical member 1 is more easily attached to a shielding body having a predetermined step or curvature, and an effect of improving design in an attached state is also obtained.

OTHER EMBODIMENTS

Although the present disclosure has been made in accordance with the embodiments, it is understood that the present disclosure is not limited to such embodiments and structures. The present disclosure encompasses various modifications and variations within the scope of equivalents. In addition, various combinations and modes, and other combinations and modes including only one element, more elements, or less elements are also within the scope and idea of the present disclosure.

Figure 12:
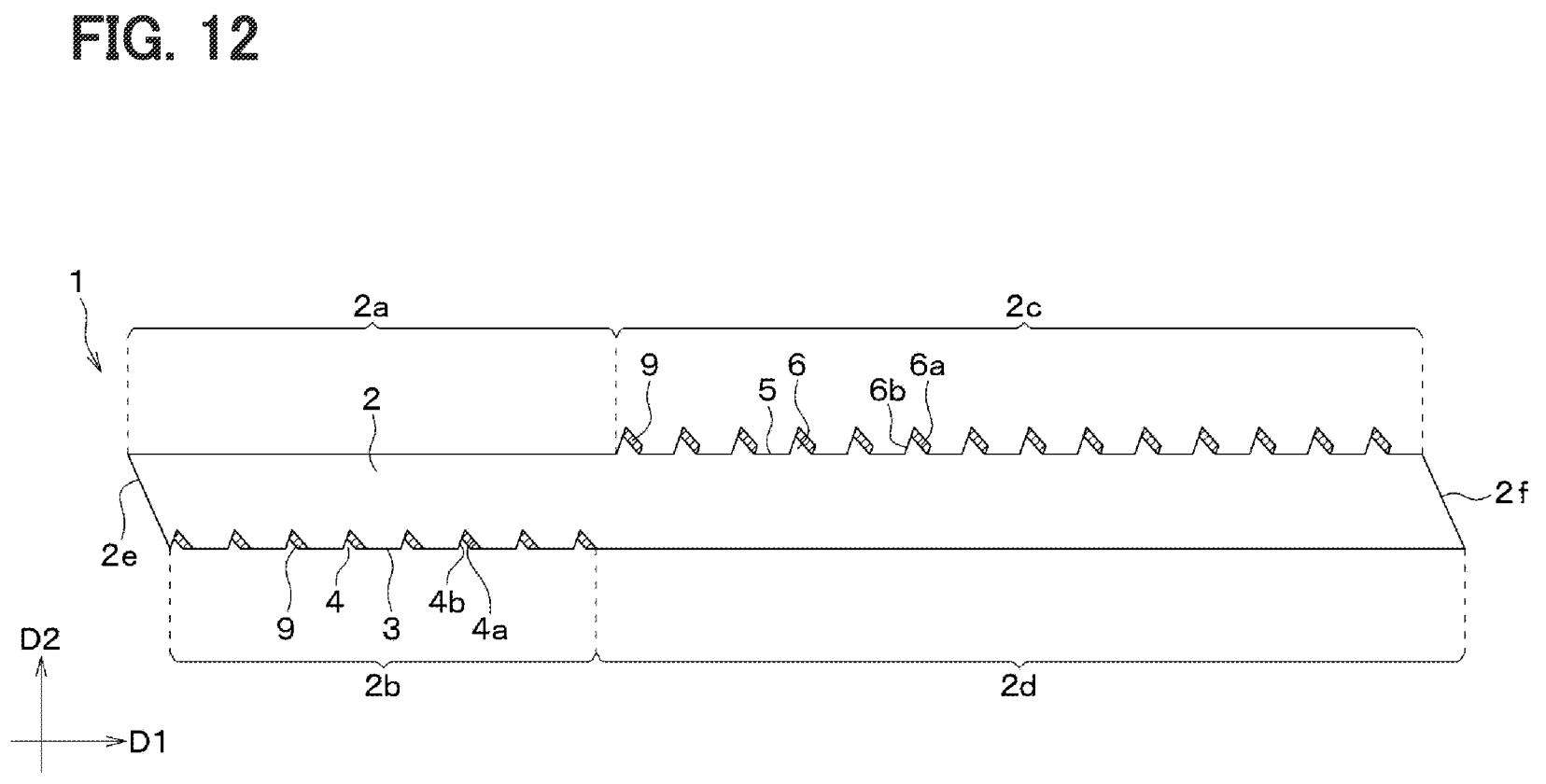

For example, in the first embodiment, as illustrated in FIG. 12, the optical member 1 may have a configuration in which a reflection film 9 is formed on inclined surfaces forming the first reflecting portions 4a and the second reflecting portions 6a, and the incident light $L_2$ is reflected by the reflection film 9 made of a reflective material different from that of the light guide body 2. In this case, the light guide body 2 may have a configuration in which the incident light $L_2$ reflected by the first reflecting portions 4a is totally reflected by the second flat portions 5 on which the incident light $L_2$ is incident, and the incident light $L_2$ reflected by the second flat portions 5 is totally reflected by the smooth emitting surface 2d. Even in such a configuration, since a semi-transmissive mirror formed of, for example, a dielectric multilayer film is not necessary, the manufacturing cost is reduced as compared with a configuration including the semi-transmissive mirror. The reflection film 9 is made of, for example, a reflective material such as a metal material such as silver (Ag) or aluminum (Al) or an alloy material, and is formed by any method such as vapor deposition.

Figure 13:
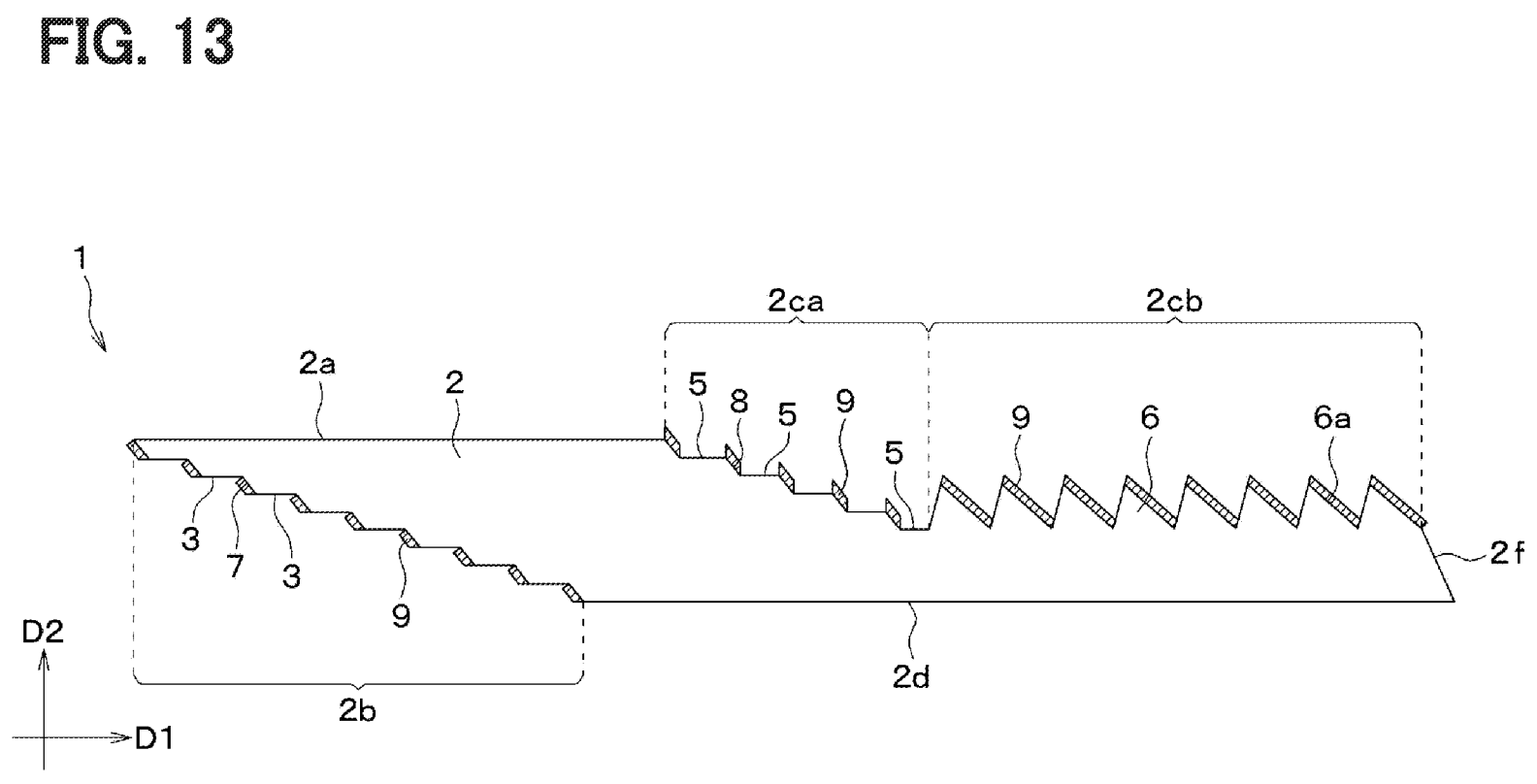

In the second embodiment, for example, as illustrated in FIG. 13, the optical member 1 may have a configuration in which outer surfaces of the second reflecting portions 6a and the step portions 7 and 8 are covered with the reflection film 9 and the incident light $L_2$ is reflected by the reflection film 9. In this case, the light guide body 2 may be configured such that the incident light $L_2$ reflected by the reflection film 9 on the first step portions 7 is totally reflected by the second flat portions 5 on which the incident light $L_2$ is incident, and the incident light $L_2$ reflected by the second flat portions 5 is totally reflected by the smooth emitting surface 2d. Even in such a configuration, since the semi-transmissive mirror is unnecessary, the manufacturing cost is reduced as compared with the configuration including the semi-transmissive mirror.

Figure 14:
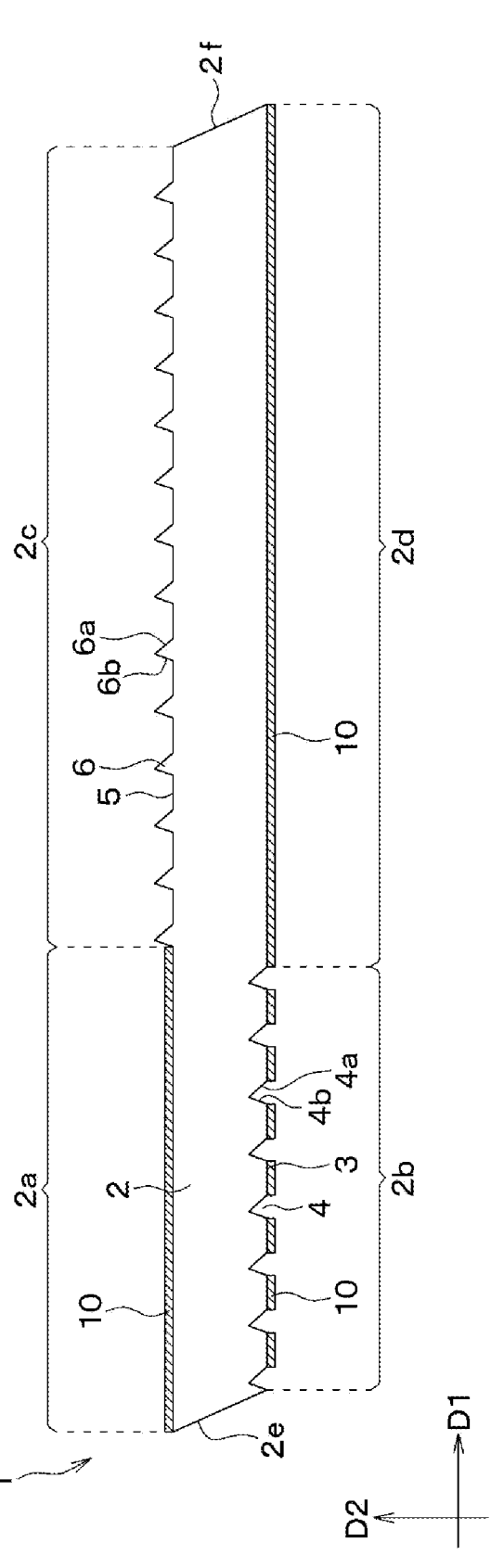
FIG. 14 is a cross-sectional view illustrating an optical member according to another modification of the first embodiment.

In the first embodiment, for example, as illustrated in FIG. 14, the optical member 1 may have a configuration in which surfaces that transmit light, that is, the smooth incident surface 2a, the first flat portions 3, and the smooth emitting surface 2d are covered with a low refractive index layer 10 formed of a material having a refractive index lower than that of the light guide body 2. Accordingly, reflection of light is restricted in the incidence of the external scene light L₁ on the smooth incident surface 2a, the incidence of the incident light L₂ on the first flat portions 3, and the incidence of the incident light L₂ reflected by the second reflecting portions 6a on the smooth emitting surface 2d. As a result, in the optical member 1, the efficiency of taking light into the light guide body 2 from the smooth incident surface 2a and the efficiency of emitting light from the first flat portions 3 and the smooth emitting surface 2d are improved, and the effect of improving the light use efficiency in the entire light guide body 2 is obtained.

The low refractive index layer 10 is made of a material that is transparent and has a refractive index lower than that of the light guide body 2, and is formed by any coating method such as spray coating. It is preferable that the low refractive index layer 10 is provided in a case where a value obtained by multiplying s transmittance T1 of the external scene light L₁ on the smooth incident surface 2a by a transmittance T2 of the incident light L₂ to the outside in the entire region of the first flat portions 3 and the smooth emitting surface 2d is a predetermined value or less (for example, 0.8 or less). The transmittance T1 is expressed by the following mathematical formula (3) based on Fresnel equation, where θ is the incident angle of the external scene light L₁ on the smooth incident surface 2a, $\varphi_1$ is the angle formed by the traveling direction of the incident light L₂ entering from the smooth incident surface 2a and the normal direction to the smooth incident surface 2a, and n is the refractive index of the light guide body 2.

$$T1 = n\frac{\cos\varphi_1}{\cos\theta}t_{1S,1P}^2 \qquad (3)$$

In the mathematical formula (3), $t_{1S}$ and $t_{1P}$ are an amplitude transmittance of the S wave and an amplitude transmittance of the P wave of the external scene light L₁ on the smooth incident surface 2a, respectively, and are expressed by the following mathematical formulas (4) and (5).

$$t_{1S} = \frac{2 \times \cos\theta}{\cos\theta + n \times \cos\varphi_1} \qquad (4)$$

$$t_{1P} = \frac{2 \times \cos\theta}{n \times \cos\theta + \cos\varphi_1} \qquad (5)$$

An incident angle when the incident light L₂ from the smooth incident surface 2a is directly incident on the first flat portions 3 or the smooth emitting surface 2d and when the incident light L₂ reflected by the second reflecting portions 6a is incident on the smooth emitting surface 2d is set as $\varphi_1$. When the refractive index of the light guide body 2 is n and the angle at which the incident light L₂ that has reached the first flat portions 3 or the smooth emitting surface 2d at the incident angle of $\varphi_1$ is emitted to the outside is set as θ, the transmittance T2 is expressed by the following mathematical formula (6) based on Fresnel equation.

$$T2 = \frac{1}{n}\frac{\cos\theta}{\cos\varphi_1}t_{2S,2P}^2 \qquad (6)$$

In the mathematical formula (6), $t_{2S}$ and $t_{2P}$ are respectively the amplitude transmittance of the S wave and the amplitude transmittance of the P wave of the incident light L₂ incident on the first flat portions 3 and the smooth emitting surface 2d at the angle of $\varphi_1$, and are expressed by the following mathematical formulas (7) and (8).

$$t_{2S} = \frac{2 \times n \times \cos\varphi_1}{n \times \cos\theta + \cos\varphi_1} \qquad (7)$$

$$t_{2P} = \frac{2 \times n \times \cos\varphi_1}{\cos\theta + n \times \cos\varphi_1} \qquad (8)$$

The low refractive index layer 10 is formed on at least one of the smooth incident surface 2a, the first flat portions 3, or the smooth emitting surface 2d to improve the light use efficiency of the light guide body 2. Therefore, the low refractive index layer 10 may be formed on all of the smooth incident surface 2a, the first flat portions 3, and the smooth emitting surface 2d, or may be formed on only a part thereof.

Figure 15:
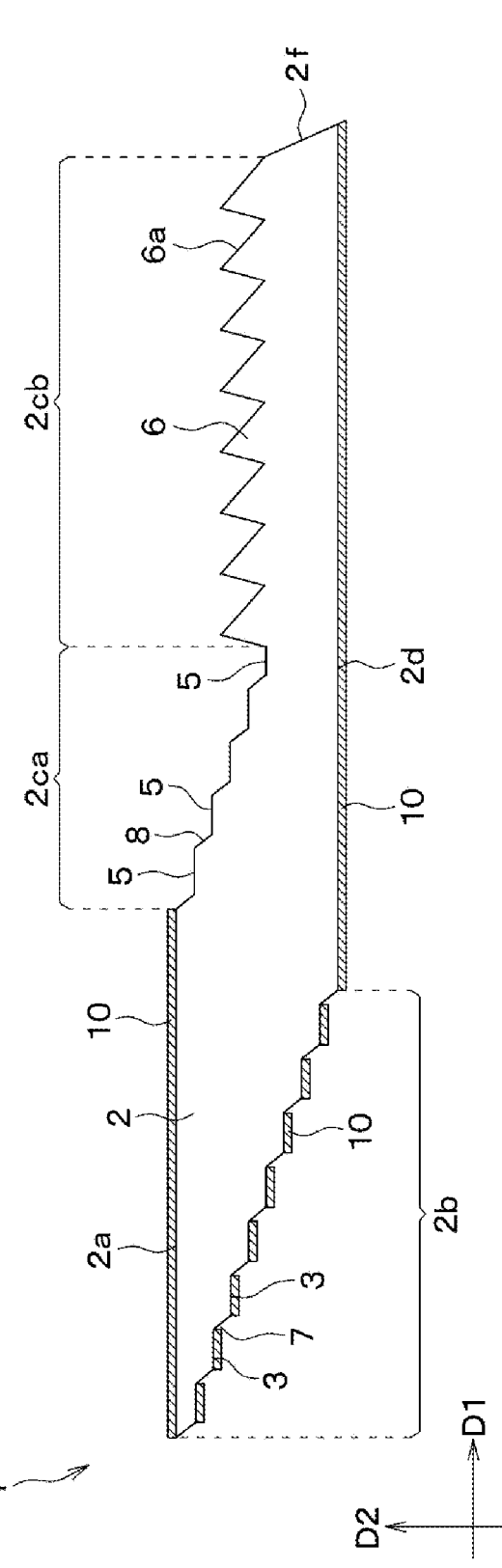
FIG. 15 is a cross-sectional view illustrating an optical member according to another modification of the second embodiment.

In the second embodiment, for example, as illustrated in FIG. 15, in the optical member 1, the low refractive index layer 10 may be formed on the smooth incident surface 2a, the first flat portions 3, and the smooth emitting surface 2d. Accordingly, in the optical member 1, the efficiency of taking light into the light guide body 2 at the smooth incident surface 2a and the efficiency of emitting the incident light L₂ from the first flat portions 3 and the smooth emitting surface 2d are improved, and the effect of improving the light use efficiency of the entire light guide body 2 is obtained.

Figure 16:
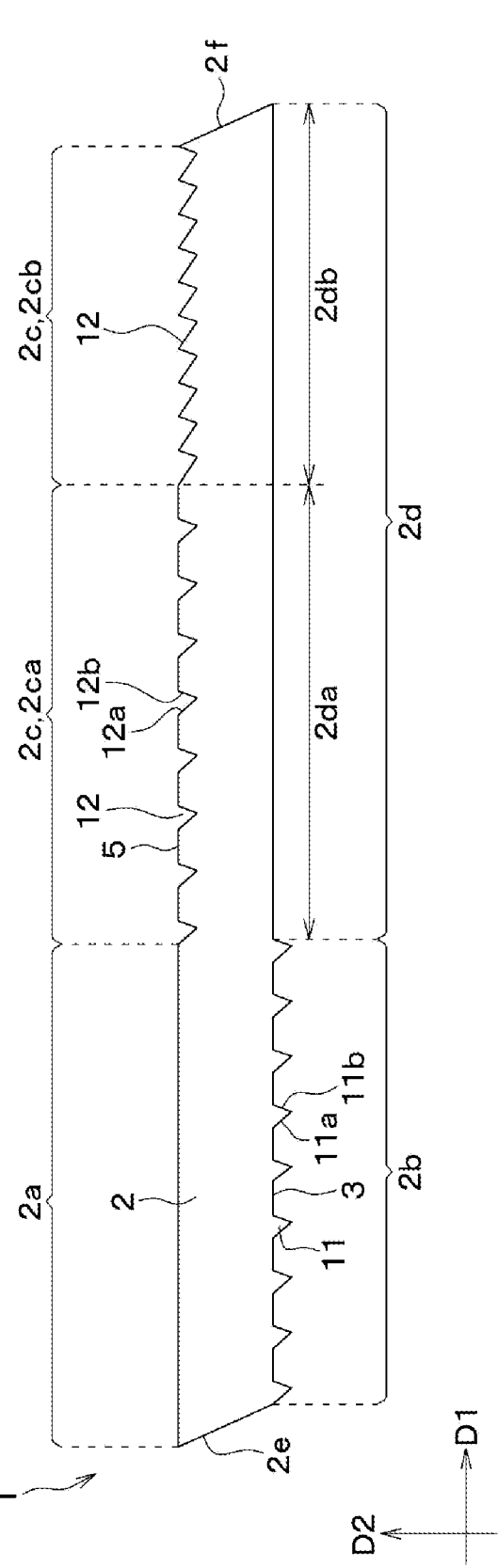
FIG. 16 is a cross-sectional view illustrating an optical member according to another modification of the first embodiment.

In the first embodiment, for example, as illustrated in FIG. 16, the optical member 1 may have a configuration in which the reflecting and emitting surface 2b includes protruding portions 11 instead of the recessed portions 4, and inclined surfaces 11a of the protruding portions 11 protruding from the first flat portions 3 form the first reflecting portions. The optical member 1 may have a configuration in which the reflecting surface 2c includes groove portions 12 instead of the prism portions 6, and inclined surfaces 12a of the groove portions 12 recessed from the second flat portions 5 form the second reflecting portions. In this case, the inclined surfaces 11a of the protruding portions 11 are inclined by a with respect to the flat surface formed by the smooth incident surface 2a or the first flat portions 3. The inclined surfaces 12a of the groove portions 12 are configured to be inclined by a with respect to the plane formed by the smooth incident surface 2a, that is, configured to be parallel to the inclined surfaces 11a. Similarly to the prism portions 6, for example, each of the protruding portions 11 has the inclined surface 11a and another surface 11b adjacent to the inclined surface 11a, and is a protrusion having a triangular shape in a cross-sectional view. In addition, similarly to the recessed portions 4, each of the groove portions 12 has the inclined surface 12a and another surface 12b adjacent to the inclined surface 12a, and is a groove having a triangular shape in a cross-sectional view. The protruding portions 11 and the groove portions 12 are formed, for example, by the same method as the prism portions 6 and the recessed portions 4. The optical member 1 may have a structure in which the protruding portions 11 constitute the first reflecting portions and the prism portions 6 constitute the second reflecting portions, or may have a structure in which the recessed portions 4 constitute the first reflecting portions and the groove portions 12 constitute the second reflecting portions. In addition, the optical member 1 may include the reflection film 9 or the low refractive index layer 10 or both of them in the configuration including the protruding portions 11 and the groove portions 12.

Figure 17:
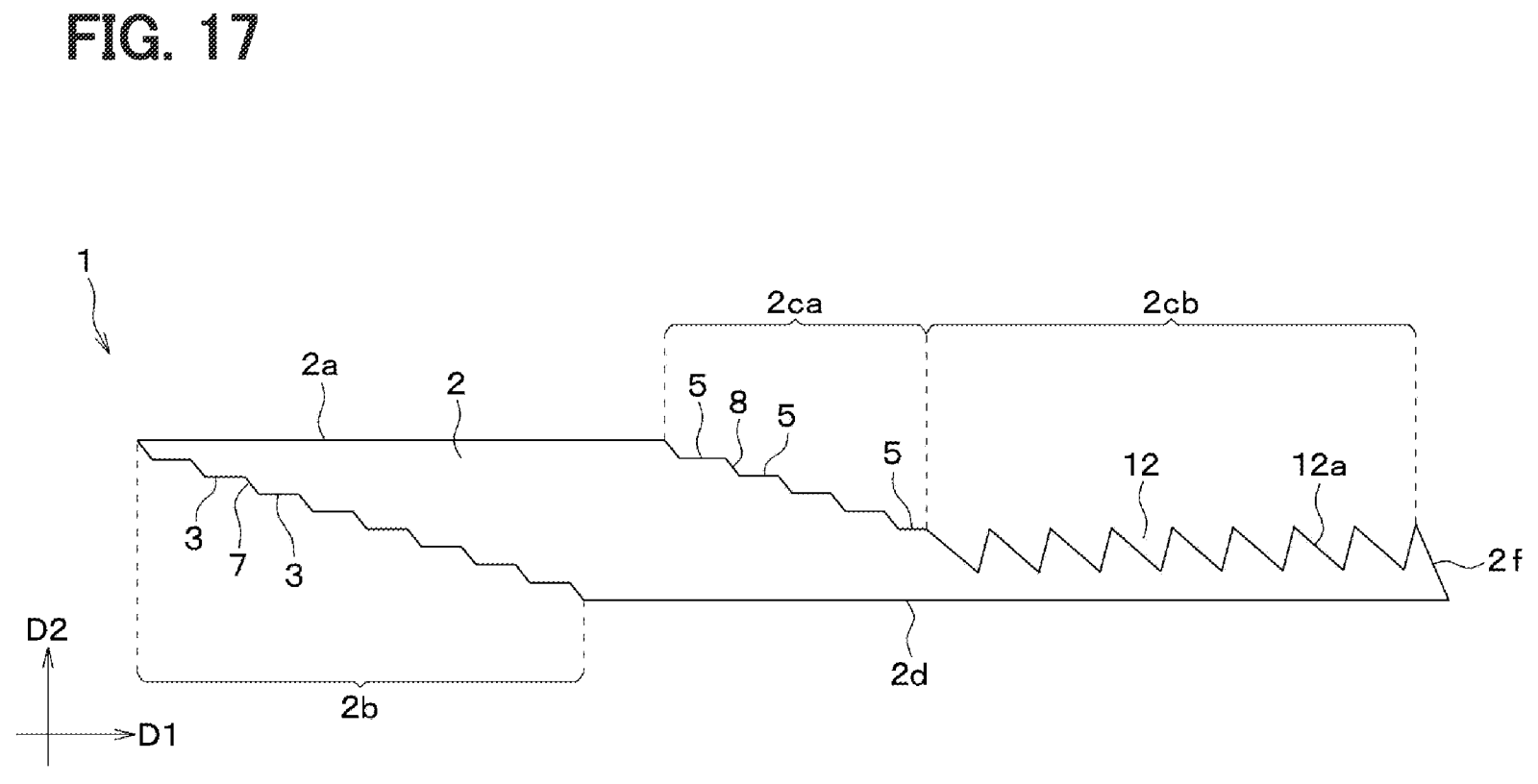

In the second embodiment, for example, as illustrated in FIG. 17, the optical member 1 may have a structure in which the second region 2$cb$ includes only the groove portions 12 instead of the prism portions 6, and the inclined surfaces 12$a$ of the groove portions 12 function as the emission reflecting surface. In this case, for example, the inclined surfaces 12$a$ of the groove portions 12 are parallel to the first step portions 7 and the second step portions 8, that is, inclined at the same angle $\alpha$ with respect to the plane formed by the smooth incident surface 2$a$. The optical member 1 may include the reflection film 9 or the low refractive index layer 10, or both of them.

The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the above embodiments, when the shape of an element or the positional relationship between elements is mentioned, the present disclosure is not limited to the specific shape or positional relationship unless otherwise particularly specified or unless the present disclosure is limited to the specific shape or positional relationship in principle.

What is claimed is:

1. An optical member comprising a light guide body that includes:

a smooth incident surface from which an external scene light enters;

a reflecting and emitting surface disposed to face the smooth incident surface, the reflecting and emitting surface including a plurality of first flat portions and a plurality of first reflecting portions that are repeatedly and alternately arranged, the plurality of first flat portions configured to emit a part of an incident light that is the external scene light from the smooth incident surface to an outside of the light guide body, the plurality of first reflecting portions configured to reflect another part of the incident light;

a reflecting surface including a plurality of second flat portions and a plurality of second reflecting portions configured to reflect a light that is the another part of the incident light reflected by the plurality of first reflecting portions; and a smooth emitting surface disposed to face the reflecting surface, wherein the smooth incident surface and the reflecting surface are continuously arranged, the reflecting and emitting surface and the smooth emitting surface are continuously arranged, the plurality of second flat portions and the plurality of second reflecting portions are configured to reflect the light reflected by the plurality of first reflecting portions in different directions toward the smooth emitting surface, and the smooth emitting surface is configured to reflect the light reflected by the plurality of second flat portions by total reflection and emit the light reflected by the plurality of second reflecting portions to the outside.

2. The optical member according to claim 1, wherein the reflecting surface includes:

a first region in which the plurality of second flat portions and the plurality of second reflecting portions are alternately arranged; and a second region in which only a plurality of prism portions or a plurality of groove portions constituting the plurality of second reflecting portions is arranged.

3. The optical member according to claim 1, wherein the plurality of first flat portions is located on a plane same as the smooth emitting surface and is parallel to the smooth incident surface, and each of the plurality of first reflecting portions is one surface of a recessed portion recessed from or a protruding portion protruding from a surface formed by the plurality of first flat portions, and is inclined such that a normal direction of the one surface faces the reflecting surface.

4. The optical member according to claim 2, wherein the smooth incident surface, the plurality of first flat portions, and the smooth emitting surface are parallel to each other, the reflecting and emitting surface has a stepped shape connecting the smooth incident surface and the smooth emitting surface, and each of the plurality of first reflecting portions is one surface forming a stepped portion connecting two adjacent first flat portions among the plurality of first flat portions, and is inclined such that a normal direction of the one surface faces the reflecting surface.

5. The optical member according to claim 4, wherein the first region is disposed to face the reflecting and emitting surface and has a stepped shape connecting the smooth incident surface and the second region, the plurality of second flat portions and the smooth emitting surface are parallel to each other, and each of the plurality of second reflecting portions in the first region is one surface forming a stepped portion connecting two adjacent second flat portions among the plurality of second flat portions, and is inclined such that a normal direction of the one surface faces the reflecting and emitting surface.

6. The optical member according to claim 1, wherein the plurality of first reflecting portions and the plurality of second reflecting portions are parallel to each other, and the light guide body satisfies relationships of sin $X \geq 1/n$ and sin $Y \geq 1/n$, where n is a refractive index of the light guide body and is larger than 1, X is an incident angle of the incident light from the smooth incident surface to the plurality of first reflecting portions, and Y is an incident angle of the light reflected by the plurality of first reflecting portions to the plurality of second flat portions.

7. The optical member according to claim 1, wherein the plurality of first reflecting portions and the plurality of second reflecting portions are covered with a reflection film made of a material different from a material of the light guide body, and reflect the light by the reflection film.

8. The optical member according to claim 1, wherein at least one of the smooth incident surface, the plurality of first flat portions, or the smooth emitting surface is covered with a low refractive index layer that is made of a material having a lower refractive index than the light guide body.

5

\*    \*    \*    \*    \*